United States Patent
Chu et al.

[19]

[11] Patent Number: 5,901,277
[45] Date of Patent: * May 4, 1999

[54] SHARED DECOMPRESSION BUFFER

[75] Inventors: Ke-Chiang Chu, Saratoga; Giovanni M. Agnoli, Santa Cruz; Kevin B. Aitken, Cupertino, all of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,608

[22] Filed: Sep. 9, 1996

Related U.S. Application Data

[63] Continuation of application No. 08/282,946, Jul. 29, 1994.

[51] Int. Cl.⁶ .................................................... G06F 15/00
[52] U.S. Cl. ............................................................ 395/114
[58] Field of Search .................................... 395/101, 109, 395/114, 250, 386, 404; 358/261.1, 261.2, 261.3; 382/232, 233, 234, 235; 707/100, 101, 205, 512; 711/147, 150, 152, 153, 170, 171, 172

[56] References Cited

U.S. PATENT DOCUMENTS

| | | | |
|---|---|---|---|
| 5,018,060 | 5/1991 | Gelb et al. | 364/200 |
| 5,150,454 | 9/1992 | Wood et al. | 395/114 |
| 5,197,117 | 3/1993 | Kato et al. | 395/105 |
| 5,247,646 | 9/1993 | Osterlund et al. | 395/425 |
| 5,337,319 | 8/1994 | Furukawa et al. | 371/11.1 |
| 5,367,331 | 11/1994 | Secher et al. | 348/14 |
| 5,377,311 | 12/1994 | Carlock et al. | 395/115 |
| 5,394,534 | 2/1995 | Kulakowski et al. | 395/425 |
| 5,500,928 | 3/1996 | Cook et al. | 345/433 |
| 5,586,093 | 12/1996 | Honda et al. | 369/32 |
| 5,602,976 | 2/1997 | Cooper et al. | 395/116 |

OTHER PUBLICATIONS

Wang et al. The Feasibility of Using Compression to Increase Memory System Performance, Jun. 1994, IEEE/IEE Publications on Disc.

Mukherjee et al, Multibit Decoding/Encoding of Binary Codes Using Memory Based Architectures, Jan. 1991, IEEE/IEE on Disc.

*Primary Examiner*—Scott Rogers
*Assistant Examiner*—Gabriel I. Garcia
*Attorney, Agent, or Firm*—Carr & Ferrell LLP

[57] ABSTRACT

A decompression approach utilizing a single buffer to reduce working memory space decompression requirements. Loading a compressed data file into the "back end" of a buffer and progressively loading the resulting decompressed data into the "front end" of the buffer avoids allocating multiple buffers for the decompression process. Using a slop value to increase the size of the allocated buffer beyond the original uncompressed data size avoids inadvertently overwriting not yet uncompressed data still residing in the back end of the single buffer when storing just decompressed data in the front end of the single buffer.

16 Claims, 9 Drawing Sheets

SHARED DECOMPRESSION BUFFER

This is a continuation of co-pending application(s) Ser. No. 08/282,946 filed on Jul. 29, 1994.

FIELD OF THE INVENTION

The present invention relates generally to data compression and decompression systems. More specifically, the present invention relates to reducing the amount or number of buffers allocated for the decompression process.

BACKGROUND OF THE INVENTION

The amount of time (referred to as expansion speed) and the amount of memory (referred to as working storage space) needed to decompress already compressed data are common issues when designing a compression/decompression system. It is generally desirable to be able to expand compressed data as quickly as possible while at the same time using a minimum of available working memory. This is particularly true with play-back decompression application situations (where time can be spent to compress data in a particular way that makes decompression a faster process) and with software installation programs (which oftentimes do not have control over, or access to, all of the memory generally available to the user environment).

Various approaches have been taken in the past to improve expansion speed and to reduce working storage space. It is typical in these prior approaches to utilize two separate buffers in the decompression process. Referring now to FIG. 1, typically two data buffers are allocated at the beginning of the expansion process, one for holding the compressed data (Input Buffer 101), and the other for holding the expanded data (Output Buffer 105).

The compressed data is typically fetched from an external storage device and is placed in Input Buffer 101 before the expansion process begins. Then, the compressed data is read from Input Buffer 101, piece by piece or block by block a codeword at a time, and is expanded by the decompression engine 103. The resulting decompressed blocks are then placed in Output Buffer 105, as shown in the figure. Lastly, the decompressed data is moved out of Output Buffer 105 and into some other longer term storage medium or area, e.g., available working space in system RAM, an internal hard drive, etc., for later use.

Unfortunately, this double buffer requirement (having both an input buffer and an output buffer) is very undesirable, particularly in a small working memory environment such as typically exists with a portable device, and is counter to one of the basic objectives of reducing the amount of working memory space needed for the decompression process.

The present invention utilizes a single buffer to decompress already compressed data and thus reduces the amount of working memory space needed.

SUMMARY OF THE INVENTION

It is an object of the present invention to provide an improved compression/decompression system.

It is a further object of the present invention to provide a compression/decompression system with reduced decompression working memory requirements.

The foregoing and other advantages are provided by a decompression method in a computer system, said computer system comprising a processor, external storage and working memory, said decompression method comprising reading a compressed data file from said external storage, allocating a single portion of said working memory for said compressed data file, loading said compressed data file into a back end of said allocated single portion of said working memory, and decompressing said compressed data file in said working memory by progressively decompressing the compressed data file into a decompressed data file and loading said decompressed data file into a front end of said working memory.

The foregoing and other advantages are also provided by a decompression system for decompressing a compressed data file said decompression system comprising, a processor means, an external storage means, a working memory means, a means for reading the compressed data file from the external storage means, an allocation means for allocating a single portion of the working memory means, a means for loading the compressed data file into a back end portion of the allocated single portion of the working memory means, and a decompression means for decompressing the compressed data file in the working memory means by progressively decompressing the compressed data file into a decompressed data file and loading the decompressed data file into a front end portion of the working memory means.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

Figure 1:
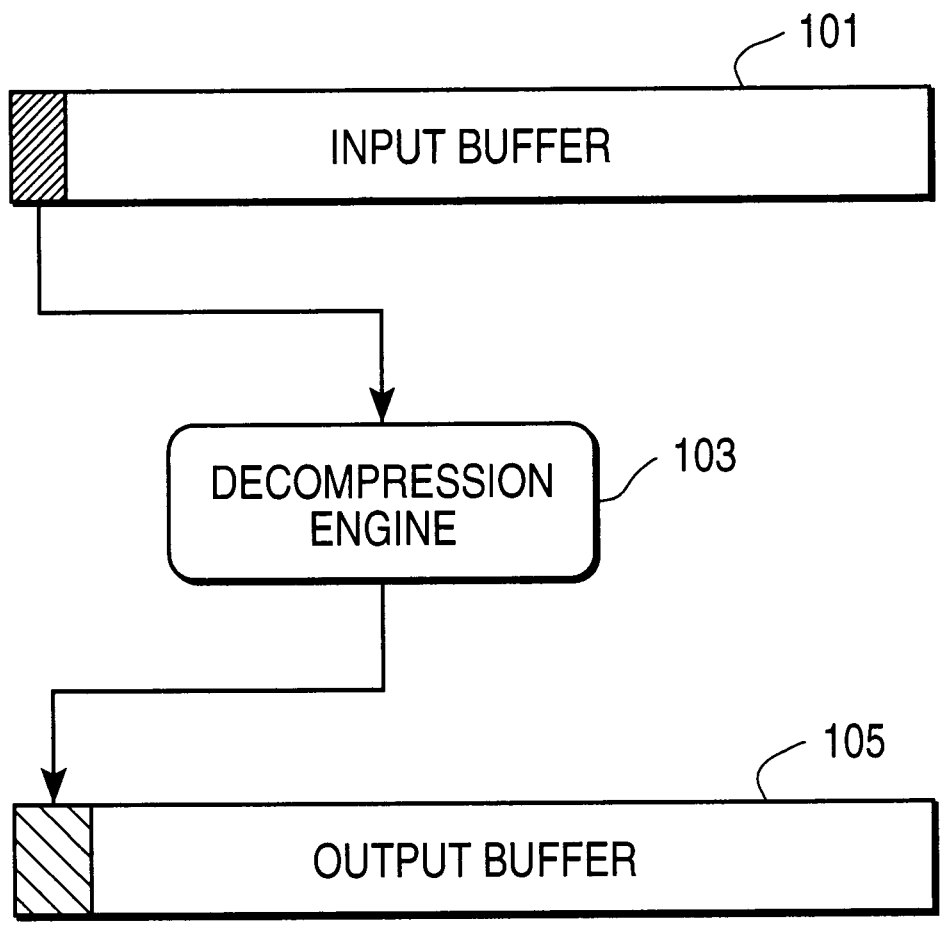
FIG. 1 is a diagram of a typical double buffer decompression process.
Figure 2:
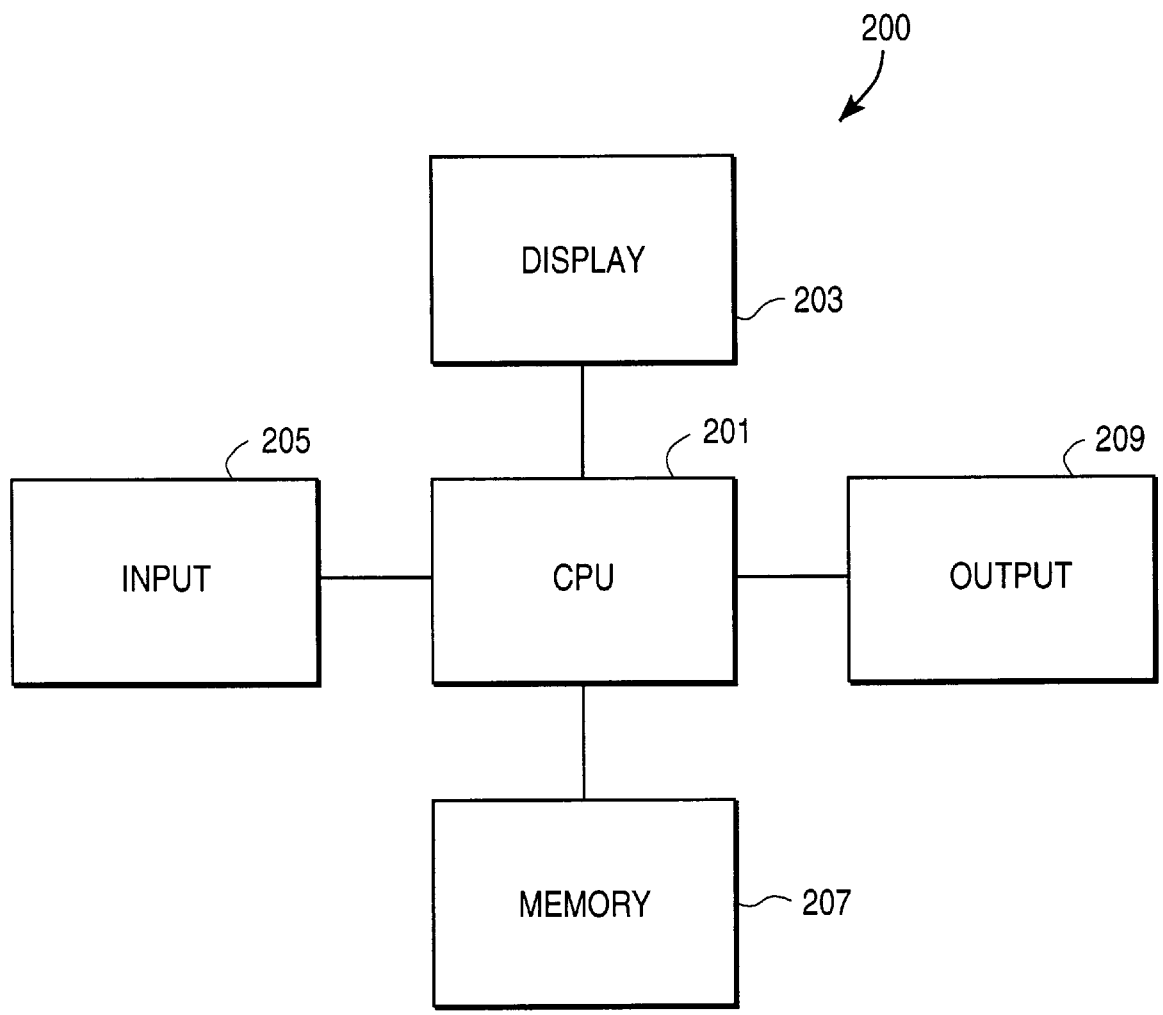
FIG. 2 is a diagram of a typical computer system as might be used with the present invention.

The present invention will be described below by way of one or more preferred embodiments as an improvement over the aforementioned data decompression approaches, and implemented on an Apple® Macintosh® (registered trademarks of Apple Computer, Inc.) computer system. It is to be noted, however, that this invention can be implemented on other types of computers and electronic systems. Regardless of the manner in which the present invention is implemented, the basic operation of a computer system 200 embodying the present invention, including the software and electronics which allow it to be performed, can be described with reference to the block diagram of FIG. 2, wherein numeral 201 indicates a central processing unit (CPU) which controls the overall operation of the computer system, numeral 203 indicates an optional standard display device such as a cathode ray tube (CRT) or liquid crystal display (LCD) screen, numeral 205 indicates an optional input device which may include both a standard keyboard and a pointer-controlling device such as a mouse as well as a microphone or other sound input device and numeral 207 indicates a memory device which stores programs according to which the CPU 201 carries out various predefined tasks.

The present invention utilizes only a single buffer for the decompression process thus saving working memory space. The present invention first allocates a single buffer into which the compressed data is then placed. Then, as the compressed data is decompressed, it too is placed in the allocated single buffer. In the preferred embodiment of the present invention, the compressed data is placed at the rear or back-end of the single buffer thus allowing room for the decompressed data to be place at the front-end of the single buffer.

Figure 3:
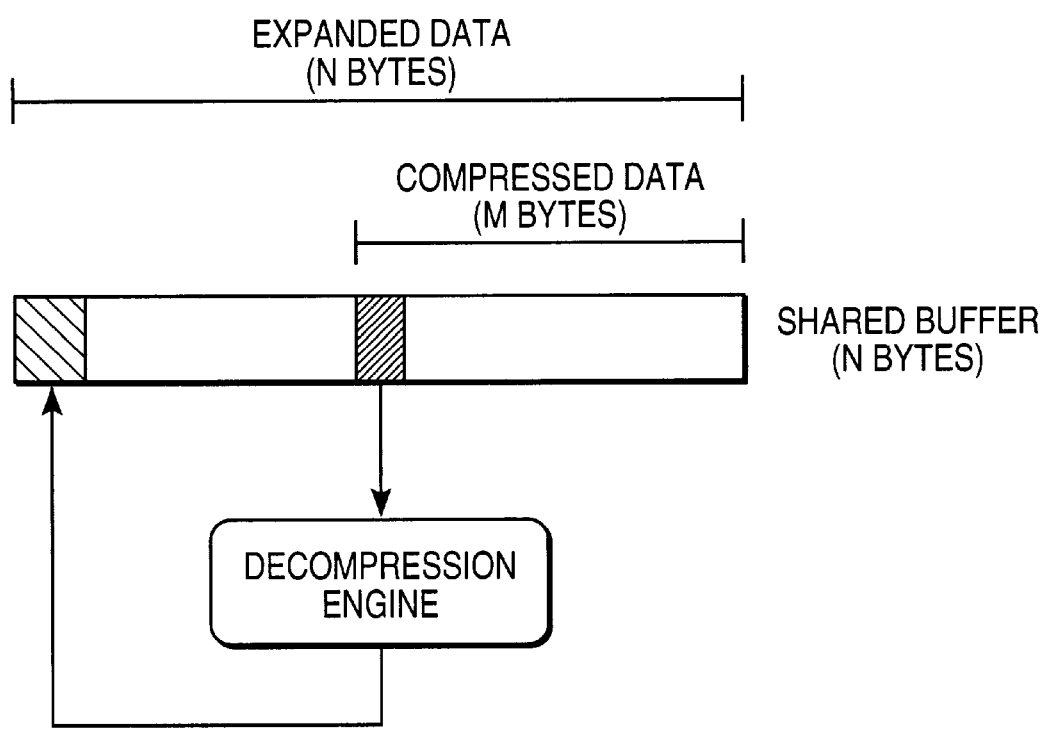
FIG. 3 is a simplified diagram of the single buffer approach of the present invention.

Assume that the compressed data file is m bytes long and the expected expanded data file is n bytes long (as may be indicated in a header to the compressed data file). Therefore, an m bytes long input buffer and an n bytes long output buffer would be needed with the traditional approach. With the approach of the present invention, only one n bytes long buffer would be needed. The compressed data would be loaded initially from byte (n–m) to byte n into the single buffer. Once the decompression process starts, the expanded data would be saved from byte 1 to byte n. In other words, the expanded data would over-write the already decompressed original compressed data, as shown in FIG. 3.

Of course, due to the basic nature of a compression process, original or uncompressed data is generally larger than the compressed data. Therefore, the allocated single buffer should generally be larger than the compressed data in order to be large enough to contain the resulting decompressed data. However, if compressing a particular data file results in a larger compressed data file, then the prudent approach would be to merely leave the data file in an uncompressed, hence smaller, state. This is accommodated in the present invention, as is explained more fully below, by setting a flag in a header of the data file which indicates that the data file has been left uncompressed.

Further, it is important to note that there is usually no linear relationship between the size of the uncompressed data file and the resulting compressing data file during or throughout the compression process. In other words, comparing the already compressed portions of a data file with the original uncompressed portions from which the compressed portions were created at different points in time during the compression process shows that the compression ratio (the size of compressed to uncompressed data) fluctuates.

During the compression process, let n' be the number of original uncompressed bytes that have been compressed and m' be the resulting number of compressed data bytes which are generated. As stated above, the relationship between m' and n' fluctuates and one cannot always guarantee that m' is less than or equal to n' at any given point in time during the compression of the data file. This can be seen by referring to FIG. 4.

Figure 4:
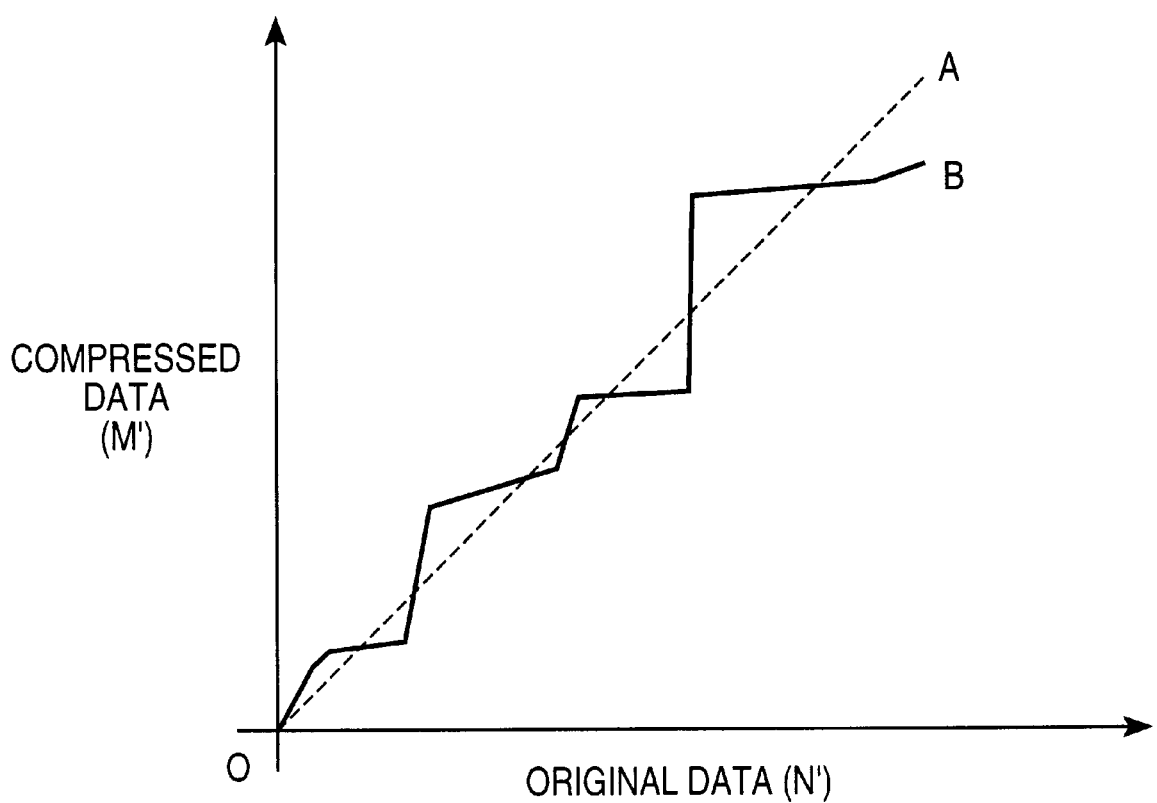
FIG. 4 is a graph of slop effect which occurs when compressing a data file.

In the graph of FIG. 4, the zig-zag line OB reflects the relationship between the length of the original uncompressed data and the length of the resulting compressed data. Whenever line OB crosses above the line OA (where n'=m'), the compression process has actually caused the compressed data to be larger than the uncompressed data. As can be seen in the figure, it is clear that although a data file may have been successfully compressed (m less than or equal to n) by the end of the data file does not always guarantee that the length of the compressed data (m') will be less than the length of the original data (n') during or throughout the compression process. This phenomenon, which occurs during both the compression and the decompression process, is referred to as "slop effect".

To better understand slop effect, let slop(n') be a function of the number of bytes of the original uncompressed data that have already been compressed (n'), such that:

$$\text{slop}(n') = \text{compressed data } (n') + \text{header size} - \text{original data } (n')$$

In other words, slop(n') is the difference between the original data size and the compressed data size (including the header, as referred to above) when n' bytes of data has been compressed. If slop(n')=0, then the compressed data has the same size as the original data. If slop(n')<0, then the compressed data is smaller than the original data (and is therefore compressible at that point in the compression process). If slop(n')>0, the compressed data is larger than the original data (and, therefore, the data physically expands due to compression at that point in the compression process).

Therefore, without taking into account the slop effect, merely loading the compressed data into the "rear end" of a single allocated data buffer during the decompression cycle, as described above, could result in some part of the compressed data being over-written before it has become expanded. To solve this potential problem, the single buffer must be large enough to accommodate both the uncompressed data and the slop effect. Therefore, it is important to calculate the slop(max), where slop(max) is defined as the maximum slop value during the compression or decompression cycle.

Once slop(max) is found, in order to decompress a compressed data file, a single working buffer of size (n+slop (max)) bytes is allocated in the preferred embodiment of the present invention. Again, the compressed data is initially loaded at the "rear end" of this single buffer. The expanded data is then saved from the beginning of the single buffer. Due to the extra buffer space of slop(max) bytes, the expanded data will not over-write the compressed data before it is expanded.

Figure 5:
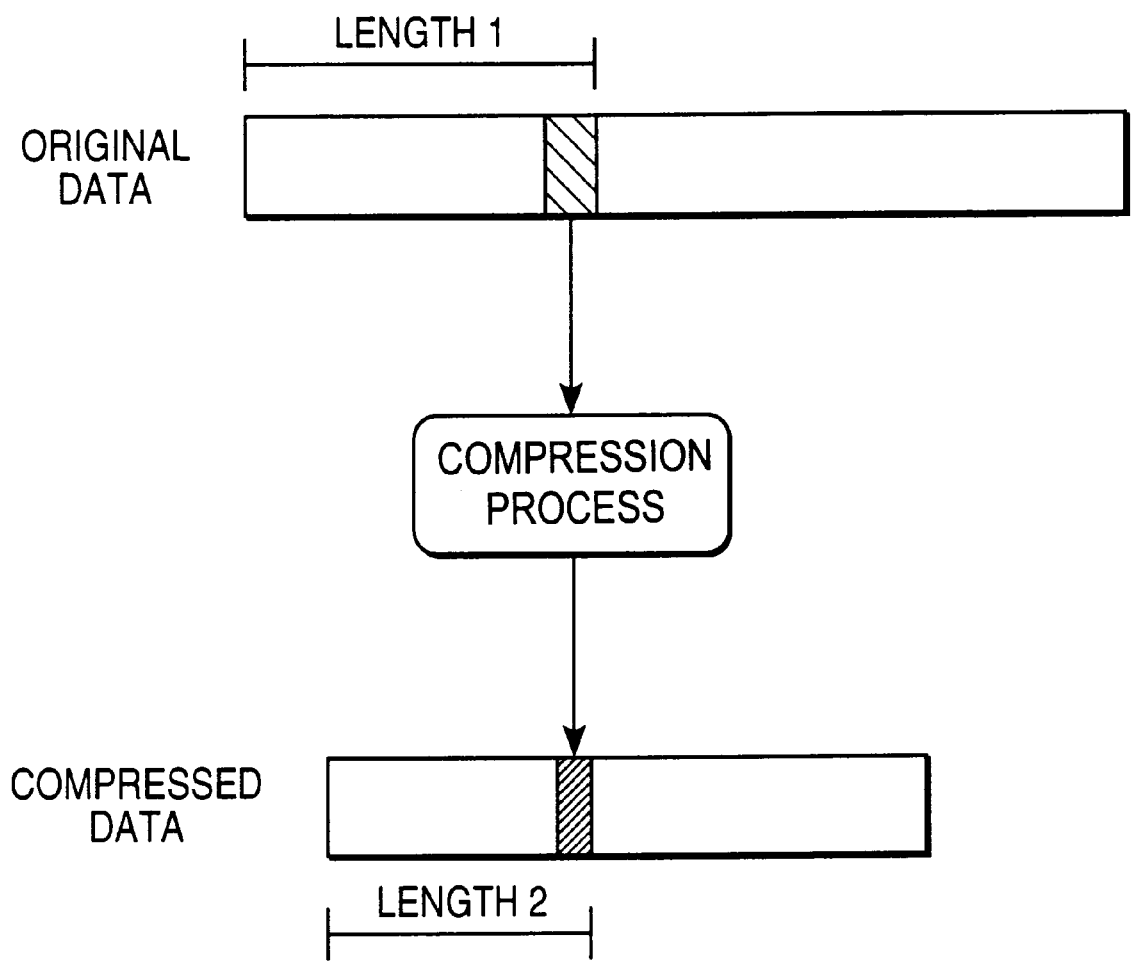
FIG. 5 is a diagram of one method of slop calculation according to the present invention.

A first method for calculating slop will now be explained. During the compression process the length of the original data that has already been compressed (Length 1) and the length of the resulting compressed data (Length 2) are tracked, as can be seen in FIG. 5. Stated differently, Length 1 is defined as the total length of the original data that has already been compressed as of that point in time during the compression process. And Length 2 is defined as the total length of the resulting compressed data that has been generated as of that point in time during the compression process. Note that that portion of the data file is compressible if Length 1>Length 2. Slop is then defined as:

$$\text{Slop} = \text{Max } (0, \text{ Length } 2 - \text{Length } 1) \qquad \text{Eq. (A)}$$

For play back decompression applications, this slop calculation process needs to be done only once and is conducted during the compression cycle. In the preferred embodiment of the present invention, the calculated Slop value is saved in the header of the compressed data.

Figure 6:
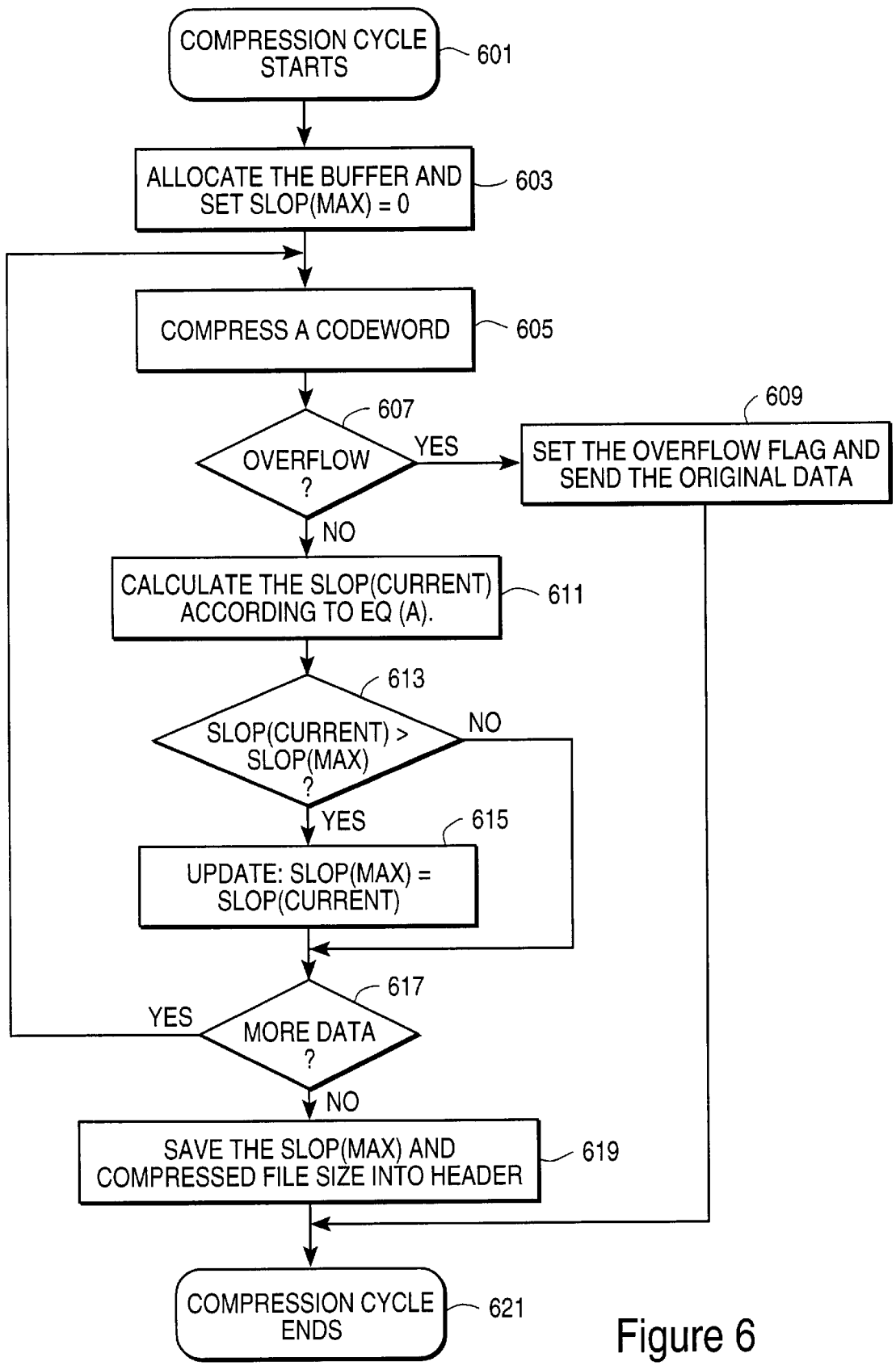
FIG. 6 is a flowchart of the compression process of the present invention.
Figure 7:
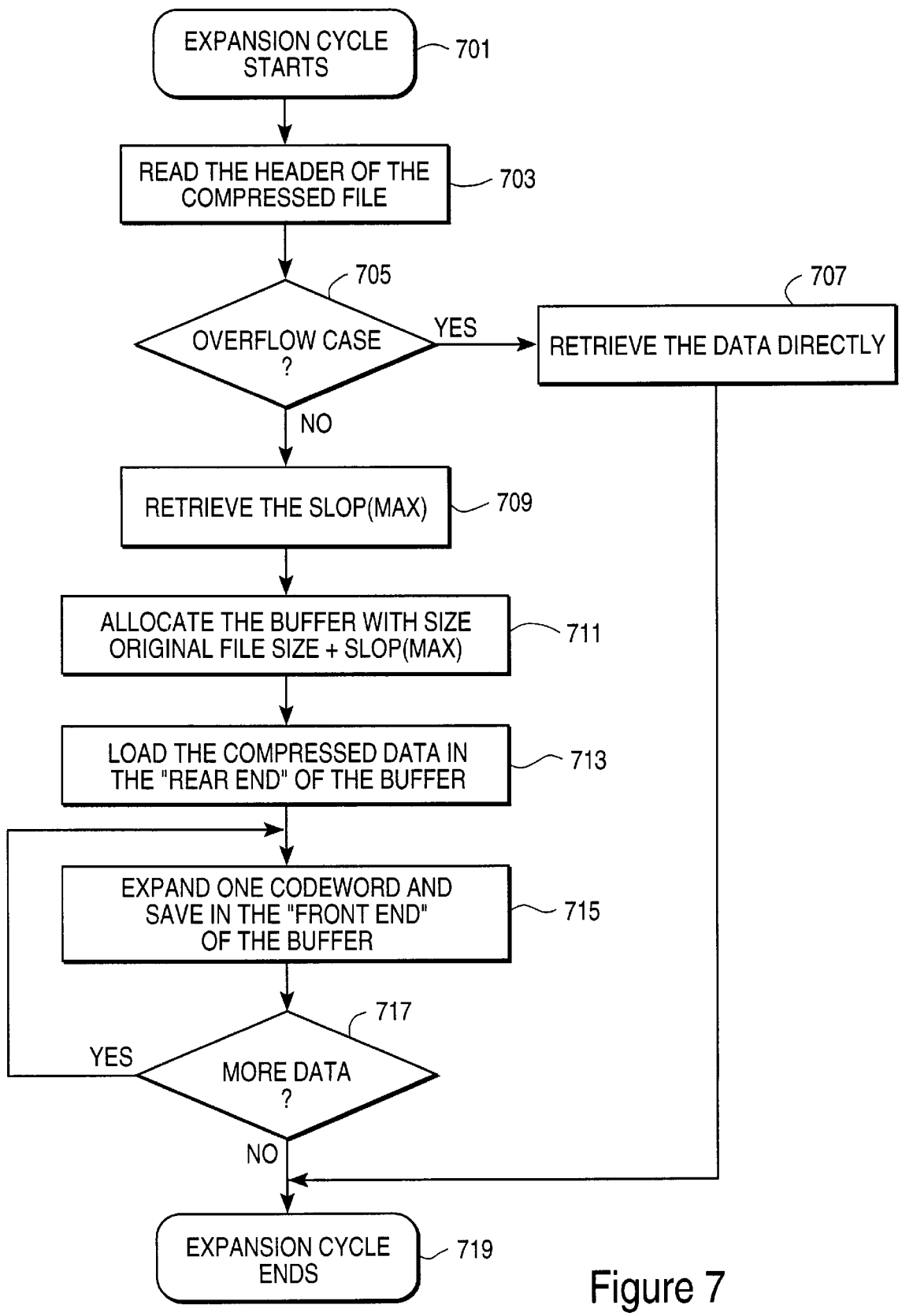
FIG. 7 is a flowchart of the decompression process of the present invention.

Referring now to FIGS. 6 and 7, flowcharts of the compression and decompression process of the present invention can be seen. In the compression process of FIG. 6, the compression cycle begins 601 by allocating a compression buffer and setting the Slop(max) value to zero 603.

Then the first (or next) codeword of the data file is compressed 605 after which the size of the compressed data file is checked against the size of the original data file for an overflow condition (where the compression process has created a larger, rather than a smaller, data file). If an overflow condition exists 607 then the overflow flag is set in the header and the original uncompressed data file is sent rather than a compressed version 609. Conversely, if no overflow condition exists 607 then the current Slop calculation is made according to Equation A above. Then, the current Slop calculation is compared to the maximum Slop value 613 to determine whether it is larger, in which case Slop(max) is updated with the current Slop value 615, or else it is merely equal to or less than, in which case the current Slop(max) value is retained. Then a determination is made whether there is more data to be compressed 617 and if so the above process 605 through 617 is repeated. Otherwise the Slop(max) value and the compressed data file size are stored in the data file header 619 and the compression process ends 621.

In the expansion cycle of FIG. 7, the decompression process begins 701 by reading the data file header 703. If the compression process resulted in a compressed data file larger than the original uncompressed data file then the overflow condition would be indicated in the header 705 and the data would be retrieved directly (no decompression would be necessary) 707 and the expansion process would end 719. Conversely, if no overflow condition existed 705, then the Slop(max) value would be retrieved 709 from the data file header and a single buffer would be allocated with a size equal to the original uncompressed data file size (as indicated in the data file header) plus the Slop(max) value 711. Then, the compressed data would be placed in rear or back end of the allocated buffer 713. Then, the first codeword of the data file would be expanded (decompressed) and stored in the front end of the buffer 715 and, if there was more data to be decompressed 717, process steps 715 through 717 would be repeated until the end of the compressed data file were reached in which case the expansion process would end 719.

A second method for calculating slop will now be explained. This method requires an additional step after the compression cycle, however, it is a more accurate Slop calculation. Further, because it needs to be conducted only once, it is therefore an equally good approach.

Figure 8:
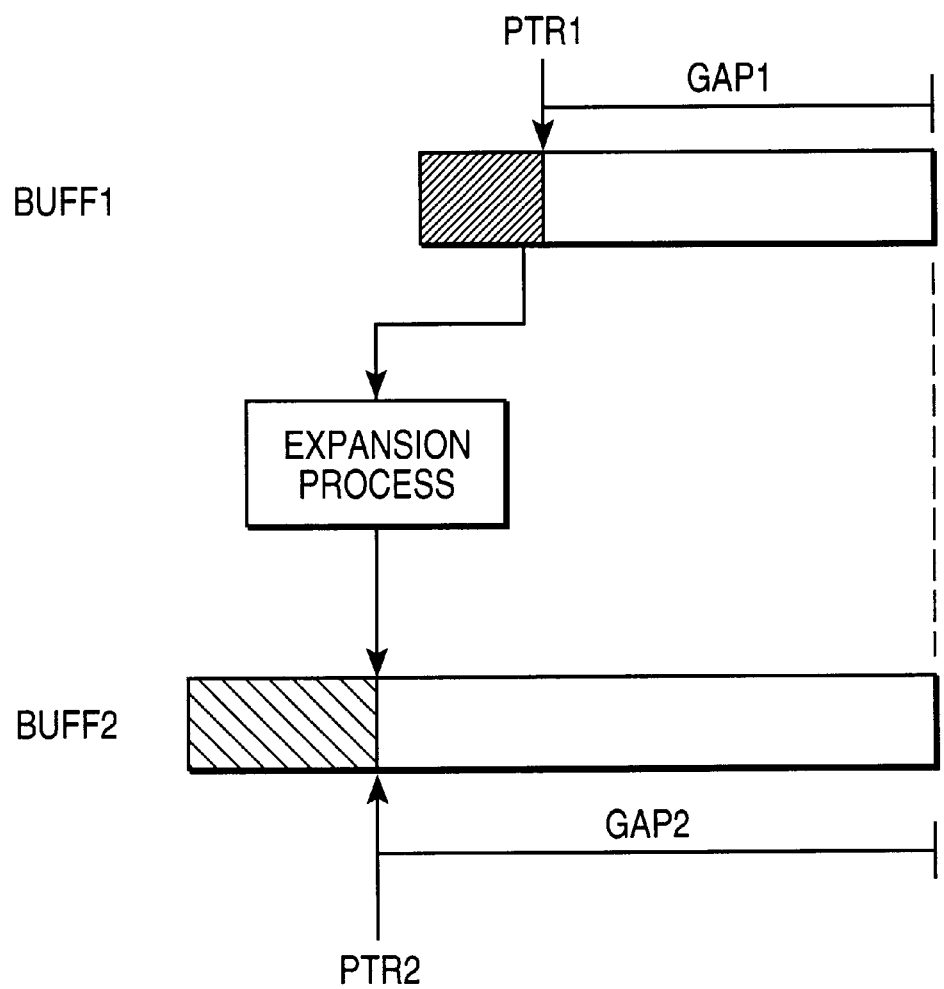
FIG. 8 is a diagram of another method of slop calculation according to the present invention; and, FIG. 9 is a flowchart of another compression process according to the present invention.

With the second method of slop calculation, during the compression cycle the data is compressed without worrying about the Slop factor. Then, after the compression process is completed, the Slop calculation begins. Referring now to FIG. 8, two buffers would be used for the second method of Slop calculation, one having a length equal to the compressed data (Buff1), and the other having a length equal to the original uncompressed data (Buff2). The compressed data is first loaded into Buff1. A normal expansion cycle is then conducted. The resulting expanded data is then saved in Buff2.

Two pointers, Ptr1 and Ptr2 are defined as follows (see the figure):

Ptr1: pointer points to the beginning of the block of data to be expanded during the SLOP calculation and stored into Buff1; and, Ptr2: pointer points to the beginning of the block of the location the expanded block of data is saved into Buff2.

Two gaps or length values, Gap1 and Gap2, are defined as follows (see the figure):

Gap1: the length of the gap between Ptr1 and the end of Buff1; and,

Gap2: the length of the gap between Ptr2 and the end of Buff2.

Given these parameters, slop can be calculated as follows according to the second slop calculation method of the present invention:

$$\text{Slop} = \text{Max}(0, \text{Max}(\text{Gap1} - \text{Gap2})) \quad \text{Eq. (B)}$$

Again, as was stated above, in the preferred embodiment of the present invention the calculated Slop value is then saved in the header of the compressed data.

Figure 9:
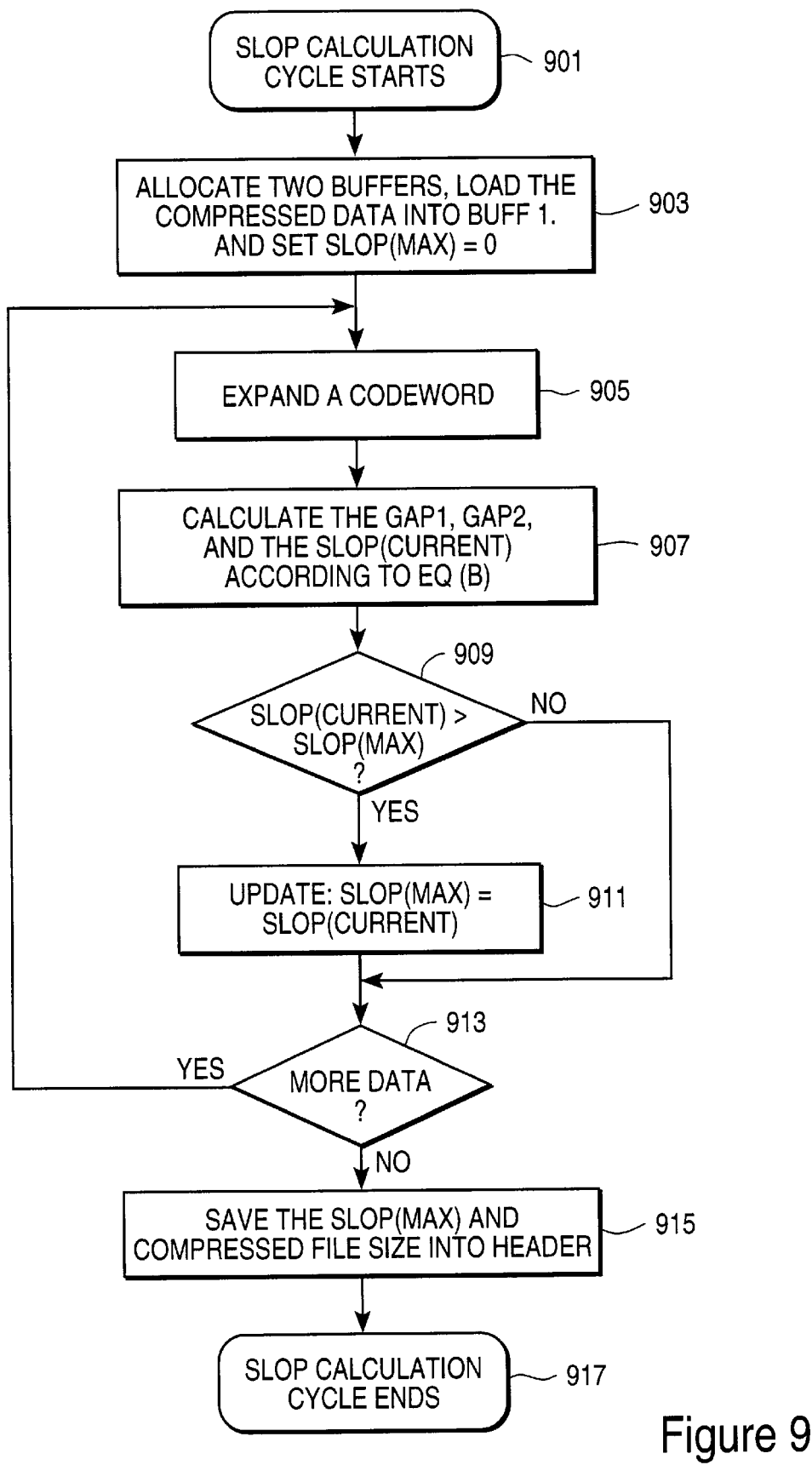

Referring now to FIG. 9, this second method of Slop calculation will be further explained. The second method of Slop calculation begins 901 by allocating two buffers, loading the compressed data into Buff1 and setting Slop(max) to zero 903. Then the first codeword would be expanded (decompressed) 905 and the Gap1, Gap2 and Slop(current) values would be calculated according to Equation B above 907. Then, if the Slop(current) is greater than Slop(max) 909, then Slop(max) is updated to Slop(current) 911, else Slop(max) is not altered and the compressed data file is checked for more data to be expanded 913 in which case process steps 905 through 913 are repeated. Otherwise the Slop(max) value and the compressed data file size are stored in the data file header 915 and the slop calculation process ends 917.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A method for a computer system to decompress a file, said computer system including external storage and working memory, said method comprising:

a) reading a compressed data file from said external storage;

b) allocating a single portion of said working memory having, based on compression information about said compressed data file, a minimally sufficient space for initially storing said compressed data file and for progressively storing portions of said compressed data file in decompressed form by overwriting space which initially stored portions of said compressed data file that have since been decompressed, wherein said minimally sufficient space has a size of the decompressed data file plus pre-calculated slop space based on compression information about said compressed data file;

c) loading said compressed data file into a back end of said single portion of said working memory; and d) decompressing said compressed data file in said single portion of working memory by progressively decompressing the compressed data file into a decompressed data file and loading said decompressed data file into a front end of said single portion of working memory, whereby storage within said single portion of working memory, which contains portions of said compressed data file that have undergone decompression, is available for storage of said decompressed data file.

2. The method of claim 1 wherein said single portion of said working memory is a buffer.

3. The method of claim 1 wherein said space is sufficient to avoid overrunning said single portion of said working due to slop effect.

4. The method of claim 1 wherein information concerning said minimally sufficient space is retrieved from said compressed data file.

5. The method of claim 4 wherein said information is retrieved from a header of said compressed data file.

6. A decompression system for decompressing a compressed data file, said decompression system comprising:

a) processor means;

b) external storage means;

c) working memory means;

d) means for reading the compressed data file from the external storage means;

e) allocation means for allocating a single portion of the working memory means having, based on compression information about said compressed data file, a minimally sufficient space for initially storing said compressed data file and for progressively storing portions of said compressed data file in decompressed form by overwriting space which initially stored portions of said compressed data file that have since been decompressed, wherein said minimally sufficient space has a size of the decompressed data file plus pre-calculated slop space based on compression information about said compressed data file;

f) means for loading the compressed data file into a back end portion of the single portion of the working memory means; and g) decompression means for decompressing the compressed data file in the single portion of the working memory means by progressively decompressing the compressed data file into a decompressed data file and loading the decompressed data file into a front end of the single portion of working memory means, whereby storage within said single portion of working memory, which contains portions of said compressed data file that have undergone decompression, is available for storage of said decompressed data file.

7. The decompression system of claim 6 wherein the single portion of the working memory means is a buffer.

8. The decompression system of claim 6 wherein the allocation means allocates the single portion to have a size minimally sufficient to contain the decompressed data and to avoid overrunning the single portion of said working memory due to slop effect.

9. The decompression system of claim 6 wherein information concerning said minimally sufficient space is retrieved from said compressed data file.

10. The decompression system of claim 9 wherein said information is retrieved from a header of said compressed data file.

11. A method for an electronic system to decompress a file, said electronic system including a memory and a buffer having a front end and a back end, said method comprising:

a) reading a compressed data file from memory;

b) allocating a single portion of said buffer having, based on compression information about said compressed data file, a minimally sufficient space for initially storing said compressed data file and for progressively storing portions of said compressed data file in decompressed form by overwriting space which initially stored portions of said compressed data file that have since been decompressed, wherein said minimally sufficient space has a size of the decompressed data file plus pre-calculated slop space based on compression information about said compressed data file;

c) loading the compressed data file into the back end of the buffer; and d) decompressing the compressed data file in the back end of the buffer by repeatedly decompressing a successive portion of the compressed data file into the back end of the buffer and loading the decompressed successive portion of the compressed data file into the front end of the buffer, whereby storage within the buffer, which contains portions of the compressed data file that have undergone decompression, is available for storage of the decompressed data file.

12. The method of claim 11 wherein information concerning said minimally sufficient space is retrieved from said compressed data file.

13. The method of claim 12 wherein said information is retrieved from a header of said compressed data file.

14. An electronic decompression apparatus comprising:

a) means for reading a compressed data file from a memory;

b) means for allocating a single portion of a buffer having, based on compression information about said compressed data file, a minimally sufficient space for initially storing said compressed data file and for progressively storing portions of said compressed data file in decompressed form by yielding space which initially stored portions of said compressed data file that have since been decompressed, and for loading the compressed data file into a back end of the buffer, wherein said minimally sufficient space has a size of the decompressed data file plus pre-calculated slop space based on compression information about said compressed data file; and c) means for decompressing the compressed data file in the back end of the buffer by repeatedly decompressing a successive portion of the compressed data file in the back end of the buffer and loading the decompressed successive portion of the compressed data file into the front end of the buffer, whereby storage within the buffer, which contains portions of the compressed data file that have undergone decompression, is available for storage of the decompressed data file.

15. The electronic decompression apparatus of claim 14 wherein information concerning said minimally sufficient space is retrieved from said compressed data file.

16. The electronic decompression apparatus of claim 15 wherein said information is retrieved from a header of said compressed data file.

* * * * *

UNITED STATES PATENT AND TRADEMARK OFFICE
CERTIFICATE OF CORRECTION

PATENT NO. : 5,901,277
DATED : May 4, 1999
INVENTOR(S) : Ke-Chiang Chu, Giovanni M. Agnoli, Kevin B. Aitken Page 1 of 1

It is certified that error appears in the above-identified patent and that said Letters Patent is hereby corrected as shown below:

Column 6,
Line 66, after "single portion of said working" insert -- memory --.

Column 8,
Line 14, after "compressed data file" delete "into" and add -- in --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*